(12) United States Patent
Zaeper et al.

(10) Patent No.: US 6,408,557 B1
(45) Date of Patent: Jun. 25, 2002

(54) APPARATUS FOR PRODUCING RIFLING GROOVES IN A WEAPON BARREL

(75) Inventors: Manfred Zaeper, Unterlüss; Klaus Hogrebe, Hermannsburg, both of (DE)

(73) Assignee: Rheinmetall W & M GmbH, Unterlüss (DE)

(*) Notice: Subject to any disclaimer, the term of this patent is extended or adjusted under 35 U.S.C. 154(b) by 0 days.

(21) Appl. No.: 09/663,922

(22) Filed: Sep. 18, 2000

(30) Foreign Application Priority Data

Sep. 16, 1999 (DE) .......................................... 199 44 378

(51) Int. Cl.⁷ ................................................. B23C 3/32
(52) U.S. Cl. ............................................. 42/76.1; 42/78
(58) Field of Search ..................... 29/1.1, 1.11; 42/78, 42/76.1

(56) References Cited

U.S. PATENT DOCUMENTS

| | | | |
|---|---|---|---|
| 2,641,822 A | * 6/1953 | Sampson | 29/1.1 |
| 2,852,835 A | * 9/1958 | Harvey et al. | 29/1.1 |
| 2,943,381 A | * 7/1960 | Cotterman et al. | 29/1.1 |
| 3,538,568 A | * 11/1970 | Hilton | 29/1.1 |

\* cited by examiner

Primary Examiner—Stephen M. Johnson
(74) Attorney, Agent, or Firm—Venable; Norman N. Kunitz

(57) ABSTRACT

An apparatus for producing rifling grooves in a weapon barrel, in which a drawing head (1) that rotates about its longitudinal axis (5) is drawn through the respective weapon barrel by a drawing rod (2), and the rifling grooves are cut into the inside surface of the weapon barrel with corresponding drawing knives (9) disposed on the drawing head (1). To produce the rifling grooves in the respective weapon barrel at a Low cost, the drawing head (1) is provided with a central adjusting arbor (6), with which all of the drawing knives (9) can be simultaneously displaced outwardly. In the production of the rifling grooves, therefore, the drawing knives (9) need no longer be exchanged in a time-consuming process. Instead, only the setting of the drawing knives (9) is modified with the aid of the adjusting arbor (6).

6 Claims, 1 Drawing Sheet

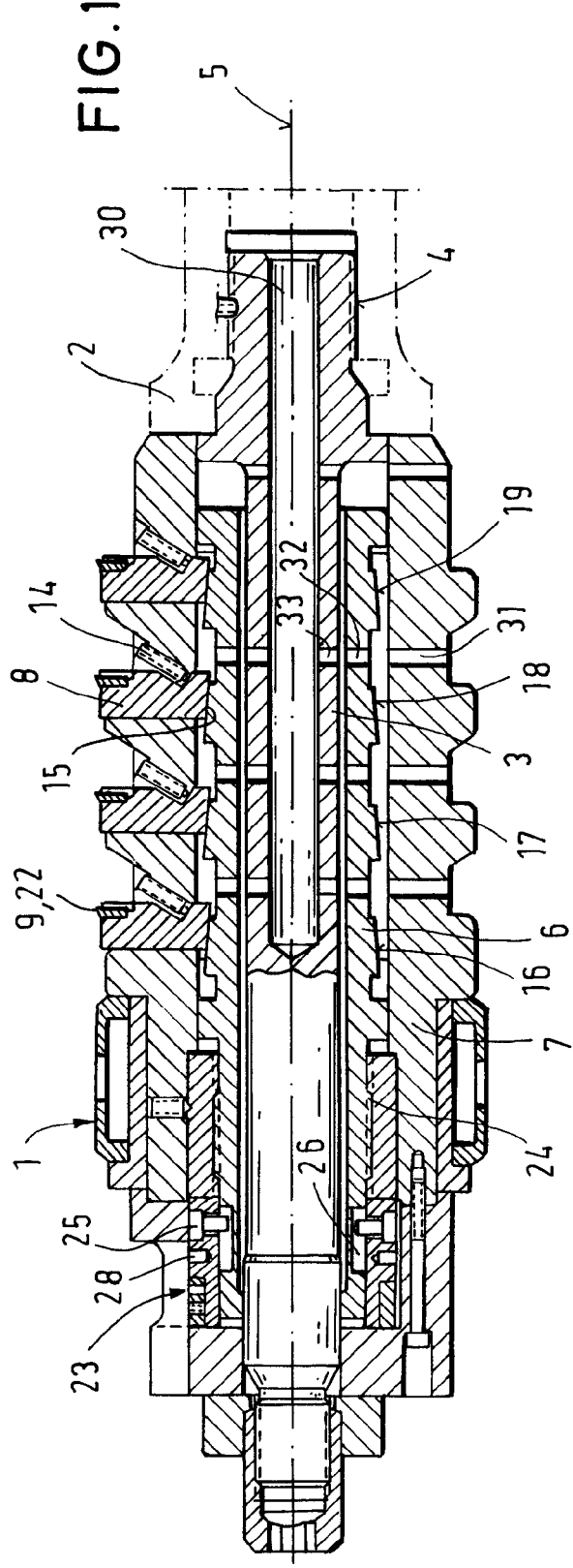
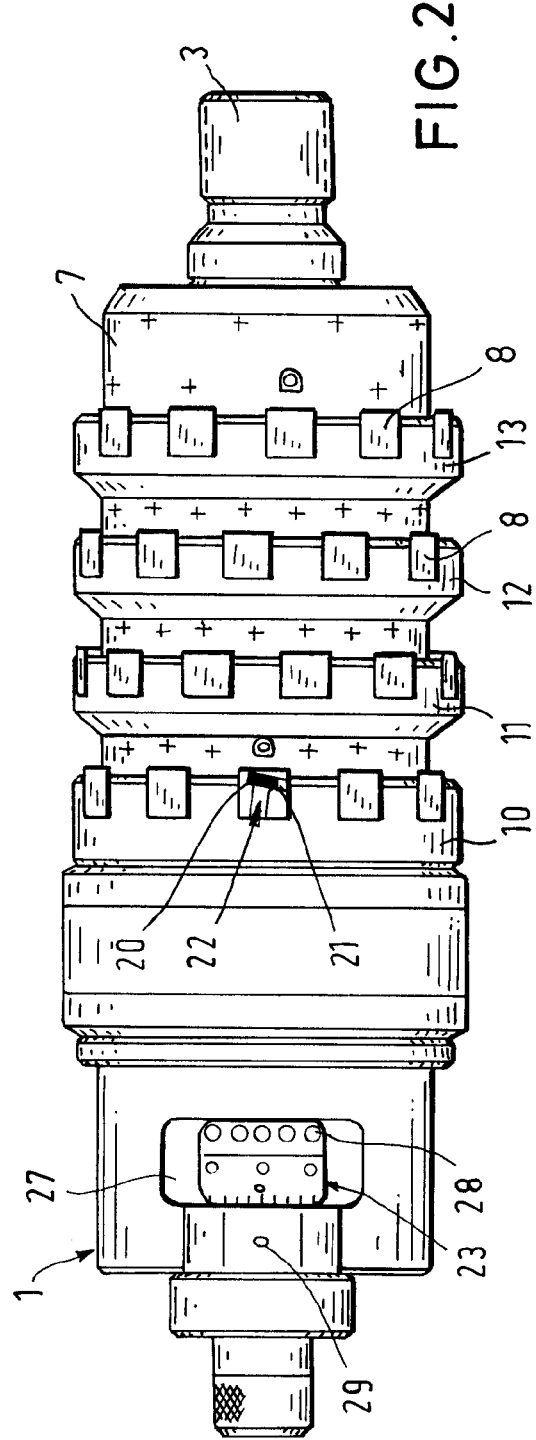

APPARATUS FOR PRODUCING RIFLING GROOVES IN A WEAPON BARREL

CROSS REFERENCE TO RELATED APPLICATION

This application claims the priority of German patent Application No. 199 44 378.5 filed Sep. 16, 1999, which is incorporated herein by reference.

BACKGROUND OF THE INVENTION

The invention relates to an apparatus or producing rifling grooves in a weapon barrel. More particularly, the present invention relates to such an apparatus in which a drawing head that rotates about its longitudinal axis is drawn through the respective weapon barrel by a drawing rod, thereby cutting the rifling grooves into the inside surface of the weapon barrel with corresponding drawing knives disposed on the drawing head.

In known apparatuses of this type, the respective drawing head has a plurality of crown-like drawing heads that corresponds to the number of rifling grooves to be produced. Because the weapon barrels have a very hard surface, the rifling grooves cannot be produced in a single drawing process. That is, the drawing head must be drawn through the weapon barrel multiple times, with a new, longer (e.g., increasing by 0.04 mm) set of drawing knives being inserted into the drawing head for each drawing process. This process is continued until the specified groove depth, or example, 1.2 mm, is attained.

A disadvantage of this known apparatus is that the exchange of the drawing knives renders the production of rifling grooves in weapon barrels unusually time-consuming and costly.

It therefore is the object of the invention to provide an apparatus for producing rifling grooves, with which the grooves can be produced at a significantly lower cost than with the known apparatuses.

SUMMARY OF THE INVENTION

The above object is achieved according to the invention by an apparatus for producing rifling grooves in a weapon barrel, in which a drawing head that rotates about its longitudinal axis is drawn through the respective weapon barrel by a drawing rod, and the rifling grooves are cut into the inside surface of the weapon barrel with corresponding drawing knives disposed on the circumferential surface of the drawing head, and wherein:

the drawing head includes a central fastening arbor, which is connectable at one end to a drawing rod, an adjusting arbor, which is mounted on and surrounds the circumference of the fastening arbor in at least a partial region, and is displaceable in the direction of the longitudinal axis of the drawing head, and a carrier member, which surrounds the circumference of the adjusting arbor in at least a partial region, and in which holders that receive drawing knives are disposed;

the holders are disposed in the carrier member for displacement radially outwardly, counter to the pressure of a spring, and are supported on their ends facing the adjusting arbor by slanted end surfaces that rest on corresponding conical regions of the adjusting arbor such that the axial displacement of the adjusting arbor effects the radial displacement of the holders, and thus of the drawing knives; and the holders are distributed on the carrier member in at least two axially spaced regions that are annular when seen in the circumferential direction. Further, particularly advantageous, embodiments of the invention are disclosed.

The invention is based on the concept of providing the drawing head with a central adjusting arbor, with which all of the drawing knives can be displaced outward simultaneously. Thus, in the production of the rifling grooves, the drawing knives no longer need to be exchanged in a time-consuming process. Instead, the setting of the drawing blades is altered with the aid of the adjusting arbor.

For the simultaneous displacement of the drawing knives, the holders that receive the knives are supported on their side facing the adjusting arbor by slanted end surfaces on corresponding conical, annular regions of the adjusting arbor such that the axial displacement of the adjusting arbor effects the radial displacement of the holders, and thus of the drawing knives.

The holders are distributed over at least two regions that appear annular when seen in the circumferential direction.

It has proven advantageous for the drawing knives to be formed by the corresponding ends of turning plates. This permits a worn drawing knife to be replaced with a new one merely through the displacement or rotation of the turning plate. At most, it is only necessary to replace the entire turning plate, but not replace all of the crowns, as in the known apparatuses.

Furthermore, upon a modification of the format of the drawing surface, it is not necessary to exchange all of the crowns. Instead, only the turning plates are exchanged.

The surface of the turning plates is preferably coated. The selection of the surface coating allows the inside surface of the weapon barrel to be adapted easily in the region of the rifling grooves to meet its corresponding requirements.

Further details and advantages of the invention ensue from the following embodiment, which is explained in conjunction with the figures.

BRIEF DESCRIPTION OF THE DRAWINGS

FIG. 1 is a longitudinal section through a drawing head of an apparatus according to the invention.

FIG. 2 is a plan view of the drawing head shown in FIG. 1.

DETAILED DESCRIPTION OF THE PREFERRED EMBODIMENTS

In FIGS. 1 and 2, a drawing head for producing rifling grooves in large-caliber weapon barrels (e.g., the illustrated drawing head cuts forty-eight rifling grooves into the weapon barrel) is represented by 1. The drawing head 1 is connected in a known manner to a drawing rod 2, whose end region is indicated by a dot-dash line in FIG. 1.

The drawing head 1 includes an axially extending fastening arbor 3, which is connected to the drawing rod 2 by way of a screw connection 4; an adjusting arbor 6 that is mounted and surrounds a portion of the circumference of the fastening arbor 3 and is displaceable in the direction of the longitudinal axis 5 of the drawing head 1; and another carrier member 7 that likewise is mounted on the fastening arbor and surrounds the circumference of the adjusting arbor 6.

Disposed in radially extending openings in the carrier member 7 are holders 8, that can be displaced along their respective axes and receive the drawing knives 9 for cutting the rifling grooves. The holders 8 are distributed over four axially spaced regions 10–13, which are annular when seen in the circumferential direction, so that twelve holders 8 are provided per region for the forty-eight rifling grooves to be cut. The holders 8 are disposed to be radially displaced in the carrier member 7, and are pressed against the adjusting arbor 6 by a respective spring-loaded pin 14. The holders 8 are supported on their end facing the adjusting arbor 6 by slanted end surfaces 15 that rest on corresponding spaced conical regions 16–19 of the adjusting arbor 6 such that the axial displacement of the adjusting arbor 6 effects the radial displacement of all of the holders 8, and thus of the drawing knives 9.

The drawing knives 9 are formed by the respective ends 20, 21 of turning plates 22, so the exchange of individual drawing knives 9 as needed can be effected by the exchange of the corresponding ends 20, 21 of the turning plates 22.

To displace the central adjusting arbor 6, a setting member 23 is provided on the end of the drawing head 1 facing away from the drawing rod 2, between the carrier member 7 and the adjusting arbor 6. This member 23 is connected to the adjusting arbor 6 by a thread connection 24 such that the rotation of the setting member 23 effects a corresponding axial displacement of the adjusting arbor 6. The adjusting arbor 6 is prevented from rotating by stop pins 25, which are fixed against relative rotation, and extend into corresponding longitudinal grooves 26 of the adjusting arbor 6, and are pressed against the side walls of the longitudinal grooves 26 when the setting member 23 is rotated.

For the setting member 23 to be rotated, a recess or opening 27, through which the setting member 23 is accessible from the outside, is provided in the carrier member 7. To rotate the setting part 23, a pin-shaped tool (not shown) is inserted into a corresponding blind bore 28 formed in the surface of the setting member 23, and the setting member 23 is rotated with this tool until the bore 28 matches a zero mark 29 that is fixed against relative rotation, so all of the drawing knives 9 are simultaneously displaced outwardly by a precisely-defined stroke. Numerous blind bores 28 are provided along the outer circumference of the setting member 23, with the respective spacing between the bores 28 corresponding to a defined feeding distance of the drawing knives 9 (e.g., 0.04 mm).

Also provided in the fastening arbor 3 is an axial bore 30, through which a cooling lubricant reaches lateral conduits 31–33 during the drawing process, with the conduits extending through the side walls of the fastening arbor 3, the adjusting arbor 6 and the carrier part 7 and into the region of the drawing knives 9.

In the production of the rifling grooves of the weapon barrel, the holders 8 are positional in the carrier part 7 so that the drawing knives 9 make contact with the inside wall of the weapon barrel. After the first drawing process, the drawing knives 9 are displaced outward centrally, through the rotation of the setting part 23, and thus through the displacement of the adjusting arbor 6, by a further 0.04 mm. This process is continued until the rifling grooves have attained their final depth (e.g., 2 mm)

The invention now being fully described, it will be apparent to one of ordinary skill in the art that many changes and modifications can be made thereto without departing from the spirit or scope of the invention as set forth herein.

What is claimed is:

1. A drawing head for producing rifling grooves in a weapon barrel, in that the drawing head is rotated about its longitudinal axis and is drawn through the respective weapon barrel by a drawing rod connected to one end of the drawing head, and the rifling grooves are cut into the inside surface of the weapon barrel with corresponding drawing knives disposed on the circumferential surface of the drawing head; said drawing, head comprising: a central fastening arbor that can be connected at one end to the drawing rod, an adjusting arbor that is mounted and surrounds a circumference of the fastening arbor in at least a partial region, and is displaceable in a direction of the longitudinal axis of the drawing head, and a carrier member that surrounds the circumference of the adjusting arbor in at least a partial region, and in which holders that receive the drawing knives are disposed; and wherein the holders are disposed in the carrier member for displacement radially outwardly, counter to the pressure of a spring, and are supported on their end facing the adjusting arbor by slanted end surfaces that rest on corresponding, conical regions of the adjusting arbor such that the axial displacement of the adjusting arbor effects the radial displacement of the holders, and thus of the drawing knives; and the holders are distributed in at least two axially spaced annular regions about the circumference of the carrier member.

2. The apparatus according to claim 1 wherein the drawing knives are formed by respective ends of turning plates, so that the drawing knives used for cutting can be changed through the exchange of the corresponding ends of the turning plate.

3. The apparatus according to claim 1 further comprising a setting member, which is mounted in the drawing head at the end remote from the end connectable to the drawing rod, for displacing the adjusting arbor, with the setting member being connected to the adjusting arbor by a threaded connection such that the rotation of the setting member effects a corresponding linear displacement of the adjusting arbor.

4. The apparatus according to claim 3, wherein the setting member is disposed between the carrier member and the adjusting arbor, and is accessible from the outside through a recess formed in the carrier member.

5. The apparatus according to claims 1 wherein each holder is provided with a pin that is spring-loaded by said spring and that is mounted in the carrier member and presses the respective holder against the adjusting arbor.

6. The apparatus according to claim 1 further comprising an axial bore disposed in the fastening arbor, and in communication with lateral conduits extending through the side walls of the fastening arbor, the adjusting arbor and the carrier member and into the region of the drawing knives so that during the drawing process a cooling lubricant can pass though.

* * * * *